No. 776,130. PATENTED NOV. 29, 1904.
P. FURST.
NECK YOKE RING.
APPLICATION FILED MAR. 14, 1904.
NO MODEL.
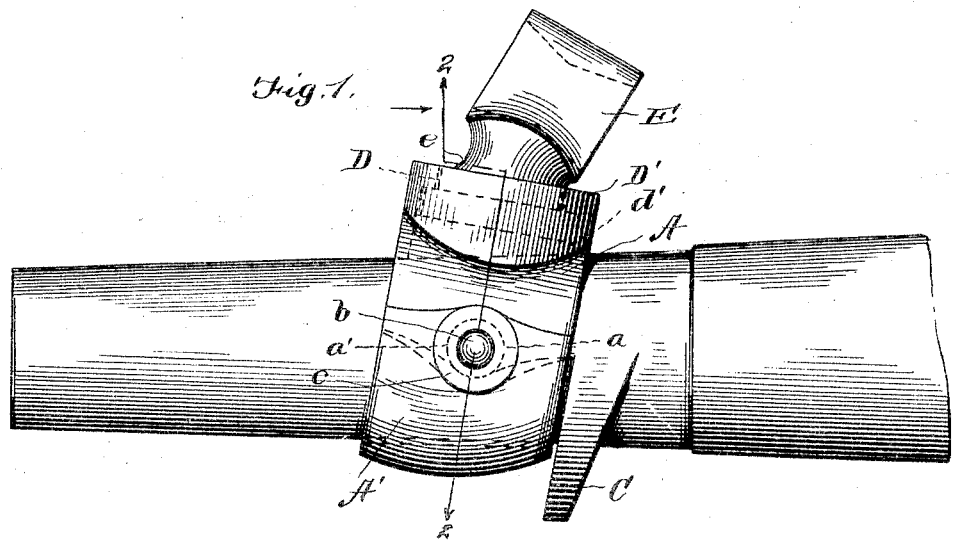
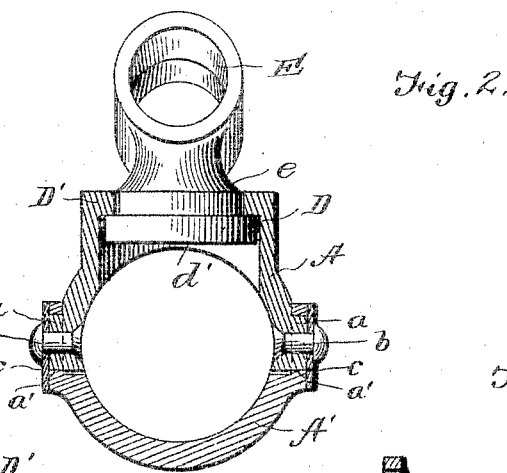
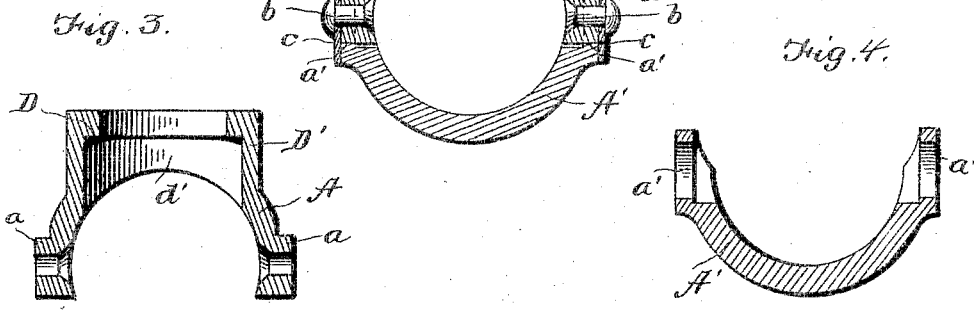
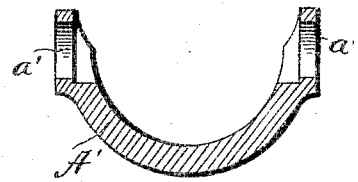
Witnesses
R. A. Boswell.
George M. Anderson.
Inventor
Peter Furst,
By E. W. Anderson
his Attorney No. 776,130. Patented November 29, 1904.

UNITED STATES PATENT OFFICE.

PETER FURST, OF ANDERSON, INDIANA.

NECK-YOKE RING.

SPECIFICATION forming part of Letters Patent No. 776,130, dated November 29, 1904.

Application filed March 14, 1904. Serial No. 198,054. (No model.)

*To all whom it may concern:*

Be it known that I, PETER FURST, a citizen of the United States, and a resident of Anderson, in the county of Madison and State of Indiana, have made a certain new and useful Invention in Neck-Yoke Rings; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side view of my invention as applied. Fig. 2 is a section on the line 2 2, Fig. 1. Fig. 3 is a detail sectional view of part A, the section being taken on the same line as is Fig. 2. Fig. 4 is a similar view of part A'.

This invention has relation to neck-yoke rings for connecting the draft-pole and yoke-stick in vehicles, and has for its object the provision of an improved device of this character for automatically gripping the pole.

With this object in view the invention consists in the novel construction and combination of parts, all as hereinafter described, and pointed out in the appended claims.

The neck-yoke ring is composed of two members A A' and has an oblique or rearward inclined relation to the pole. The lower member A' is provided at its upper portion with eyes a', at opposite sides thereof, in which fit lateral bosses a at the lower portion of the upper member, rivet-pins b passing through said bosses and through washers c, thus connecting the members in a pivotal manner.

C is an oblique abutment projection of the pole, against which the lower member A' bears at its rear end.

A socket D is formed in upward extension D' of the upper member A, in which the eye E for the yoke-stick connection has a pivotal bearing, such eye having an oblique or rearward inclined relation to the ring. This socket extension D has a high forward wall d and a low rear wall d' and is inwardly flanged at the top to confine the flanged or headed lower end of the eye-shank e.

In use upon forward pressure of the yoke by the yoke-stick the lower member A' will take a bearing against the abutment D and the upper member A will turn pivotally upon the lower member, with the result of a binding engagement of its forward edge with the draft-pole. The lower member thus remains stationary, and the vibratory movement is confined to the upper member, which turns in an easy manner and effectively and automatically grips the pole.

Having thus described my invention, what I claim as new, and desire to secure by Letters Patent, is—

1. A neck-yoke ring whose longitudinal axis has an oblique relation to the axis of its aperture, and composed of upper and lower pivotally-connected semicircular members and a yoke-stick connection device engaging the upper said member, substantially as specified.

2. An automatically-gripping neck-yoke ring composed of two pivotally-connected semicircular members and a yoke-stick connection device engaging the upper of said members, substantially as specified.

3. In a vehicle, the combination with the draft-pole having an abutment projection, of the two-part pivotally-connected neck-yoke ring having its longitudinal axis inclined to the axis of its aperture and a yoke-stick connection device engaging the upper part of the ring, substantially as specified.

4. An automatically-gripping neck-yoke ring composed of two pivotally-connected members, the upper member having an upper extension provided with a high forward wall and a low rear wall, and a rearward inclined yoke-stick eye connection seated in said extension, substantially as specified.

5. An automatically-gripping neck-yoke ring having its longitudinal axis inclined to its aperture and composed of two pivotally-connected members, the upper member having an upper extension provided with a high forward wall and a low rear wall, said extension having an inturned flange, and a rearward inclined yoke-stick eye connection having an outwardly flanged or headed lower end fitting within said upper extension, substantially as specified.

6. A neck-yoke ring whose longitudinal axis has an oblique relation to the axis of its aperture, and composed of a lower semicircular member, an upper semicircular member, and a pivotal connection for said members extending at right angles to the ring-aperture, substantially as specified.

7. A neck-yoke ring whose longitudinal axis has an oblique relation to the axis of its aperture and composed of a lower semicircular member, an upper semicircular member, a pivotal connection for said members extending at right angles to the ring-aperture, and a yoke-stick connection device engaging said upper member, substantially as specified.

In testimony whereof I affix my signature in presence of two witnesses.

PETER FURST.

Witnesses:
JAMES F. BOLEN,
E. W. LONGANECKER.